United States Patent
Davis et al.

(10) Patent No.: US 11,516,001 B2
(45) Date of Patent: Nov. 29, 2022

(54) METHOD AND SYSTEM FOR GENERALIZED PROVENANCE SOLUTION FOR BLOCKCHAIN SUPPLY CHAIN APPLICATIONS

(71) Applicant: MASTERCARD INTERNATIONAL INCORPORATED, Purchase, NY (US)

(72) Inventors: Steven C. Davis, Saint Peters, MO (US); Rob Byrne, Wicklow (IE); Robert Collins, Blackrock (IE); Leandro Nunes Da Silva Carvalho, Metuchen, NJ (US); Deborah Eleanor Barta, New York, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 100 days.

(21) Appl. No.: 17/176,538

(22) Filed: Feb. 16, 2021

(65) Prior Publication Data

US 2021/0182869 A1 Jun. 17, 2021

Related U.S. Application Data

(63) Continuation-in-part of application No. 16/875,154, filed on May 15, 2020, now abandoned.
(Continued)

(51) Int. Cl.
*H04L 29/06* (2006.01)
*H04L 9/06* (2006.01)
(Continued)

(52) U.S. Cl.
CPC ............ *H04L 9/0643* (2013.01); *G06F 16/27* (2019.01); *G06Q 30/018* (2013.01);
(Continued)

(58) Field of Classification Search
CPC ... H04L 9/3247; H04L 9/0637; H04L 9/0643; H04L 9/085; H04L 9/14; H04L 9/3073;
(Continued)

(56) References Cited

U.S. PATENT DOCUMENTS

| | | | |
|---|---|---|---|
| 10,575,179 B2 * | 2/2020 | Unnerstall | G06F 21/44 |
| 2003/0028798 A1 * | 2/2003 | Burnett | G06F 21/6218 |
| | | | 711/3 |

(Continued)

FOREIGN PATENT DOCUMENTS

| | | | | |
|---|---|---|---|---|
| CN | 106779736 A | * | 5/2017 | G06F 21/32 |
| CN | 104268758 B | * | 12/2017 | G06F 21/10 |

(Continued)

OTHER PUBLICATIONS

International Search Report (PCT/ISA/210) and Written Opinion of the International Searching Authority (PCT/ISA/237) dated Sep. 9, 2020 in corresponding International Application No. PCT/US2020/033077. (10 pages).

(Continued)

*Primary Examiner* — Sher A Khan
(74) *Attorney, Agent, or Firm* — Panitch Schwarze Belisario & Nadel LLP

(57) ABSTRACT

A method for conveying auditable information regarding provenance of a product that is cryptographically accurate while retaining complete anonymity of product and participant on a blockchain includes: receiving a product identifier; generating a digital token by applying a hashing algorithm to the product identifier; generating an entry value by applying the hashing algorithm to a combination of an event identifier and the digital token; generating a digital signature by digitally signing a data package using a private key of a cryptographic key pair, where the data package includes at least a blockchain address, the event identifier, and the
(Continued)

digital token; and transmitting the blockchain address, the digital signature, and the entry value to a node in a blockchain network.

18 Claims, 5 Drawing Sheets

Related U.S. Application Data

(60) Provisional application No. 62/851,998, filed on May 23, 2019, provisional application No. 62/874,720, filed on Jul. 16, 2019.

(51) Int. Cl.
| | |
|---|---|
| *G06Q 30/00* | (2012.01) |
| *G06F 16/27* | (2019.01) |
| *H04L 9/08* | (2006.01) |
| *H04L 9/30* | (2006.01) |
| *H04L 9/32* | (2006.01) |
| *H04L 9/00* | (2022.01) |

(52) U.S. Cl.
CPC .............. *H04L 9/0861* (2013.01); *H04L 9/30* (2013.01); *H04L 9/3247* (2013.01); *H04L 9/50* (2022.05)

(58) Field of Classification Search
CPC ... H04L 9/3213; H04L 9/0841; H04L 9/3239; G06Q 20/383; G06Q 30/0185; G06Q 2220/10
See application file for complete search history.

(56) References Cited

U.S. PATENT DOCUMENTS

| | | | | |
|---|---|---|---|---|
| 2003/0212596 | A1* | 11/2003 | DiPaolo | G06Q 30/02 705/26.1 |
| 2005/0257264 | A1 | 11/2005 | Stolfo et al. | |
| 2009/0276360 | A1* | 11/2009 | Wilde | H04L 9/3236 705/57 |
| 2010/0200648 | A1* | 8/2010 | Newton | G06Q 30/02 235/375 |
| 2012/0054049 | A1* | 3/2012 | Hayes | G06Q 20/203 705/302 |
| 2013/0080195 | A1* | 3/2013 | Cholak | G06Q 10/02 705/5 |
| 2016/0164884 | A1* | 6/2016 | Sriram | G06Q 10/06315 705/51 |
| 2016/0330027 | A1* | 11/2016 | Ebrahimi | G06F 21/645 |
| 2017/0046806 | A1* | 2/2017 | Haldenby | H04N 5/913 |
| 2017/0083860 | A1 | 3/2017 | Sriram et al. | |
| 2017/0262862 | A1* | 9/2017 | Aljawhari | G06F 16/242 |
| 2018/0341775 | A1 | 11/2018 | Gisolfi et al. | |
| 2019/0311472 | A1* | 10/2019 | Harrup | G06T 7/0004 |

FOREIGN PATENT DOCUMENTS

| | | | | |
|---|---|---|---|---|
| CN | 109690589 A | * | 4/2019 | ............. B22F 10/20 |
| JP | 2018506128 A | | 3/2018 | |
| JP | 2018148493 A | | 9/2018 | |
| WO | WO-2017093990 A1 | * | 6/2017 | ............. G06F 21/10 |
| WO | 2019021107 A1 | | 1/2019 | |
| WO | 2020236560 A1 | | 11/2020 | |

OTHER PUBLICATIONS

Office Action issued by the U.S. Patent and Trademark Office in the U.S. Appl. No. 16/875,154, dated Jan. 27, 2022, U.S. Patent and Trademark Office, Alexandria, VA. (10 pages).

Int'l Search Report and Written Opinion dated May 10, 2022 in Int'l Application No. PCT/US2022/011966.

* cited by examiner

METHOD AND SYSTEM FOR GENERALIZED PROVENANCE SOLUTION FOR BLOCKCHAIN SUPPLY CHAIN APPLICATIONS

FIELD

The present disclosure relates to the use of a blockchain to provide a solution for supply chain issues regarding provenance of products, specifically the use of a blockchain and cryptographic techniques to convey auditable information regarding a product's provenance that is cryptographically accurate while retaining anonymity of products and participants even on a blockchain.

BACKGROUND

In recent years more than ever, consumers are interested in where the products that purchase and interact with come from. There are a myriad of reasons someone may be interested in the provenance of a product: a consumer may want to ensure the manufacturer uses ethical practices, a reseller may want to confirm the ownership history of a secondhand item, a manufacturer may need to track the distribution of products related to a necessary recall, a distributor may have concerns about leakage during the distribution process of a particular product, etc. Traditionally, solutions for these problems can vary as much as the problems themselves. For instance, a distributor may use a scanning system and place its own labels on packages, but this may be of little-to-no use to the manufacturer or end user. In another example, a consumer may discover the ethical practices of a manufacturer but be unable to verify if a product they are purchasing is genuine from the manufacturer. In yet another example, a manufacturer may need a recall and know which products must be recalled but have little capability of contacting the end merchants or consumers that received the products.

As a result, existing solutions, such as supply chain programs, authenticity certificates, logistical software, etc. generally provide a specific solution directed to only one aspect of a supply chain. At the same time, many manufacturers and merchants may be wary of encompassing solutions, due to a desire to keep their network and practices and other information, such as sales or manufacturing metrics, private. Thus, there is a need for a technical system that can provide a provenance solution among the entire lifecycle of a product in a supply chain that can do so without compromising the privacy or confidentiality of a manufacturer, or even the identity of product involved.

SUMMARY

The present disclosure provides a description of systems and methods for conveying auditable information regarding provenance of a product through a blockchain. Any time an action is taken regarding the manufacturer and distribution of a product, an entry is made on a blockchain for that product. Such actions can include manufacturer of the product, aggregation of the product with other products, sending and receipt among various entities, de-aggregation of the products, sale of a product, and resale of the product. Each time an entry is made on the blockchain, the entry captures a digital signature generated by an entity involved in the event (e.g., the manufacturer when issuing the product, a distributor when receiving the product from the manufacturer, etc. The entry also captures, and the signature is provided on, a combination of an identifier associated with the event (e.g., issuance of the product, receipt of the product, sending of the product, etc.) as well as a token that is unique to the product. The token is generated by hashing an identifier that is unique to the product, which would only be obtainable by possession of the product. The result is that only individuals or entities that can physically obtain the product can identify any entries related to the product, but anyone that does can see a picture of the entire provenance of the product, such as to confirm an item being purchased is genuine. At the same time, the use of hashing and signatures means that every entity involved is kept anonymous, while allowing for auditability and verification among the entities themselves. Thus, the methods and systems discussed herein provide for a complete and auditable record of a product's provenance that is kept anonymous even on a blockchain, providing a complete end-to-end solution regarding product provenance that serves every entity involved without sacrificing privacy.

A method for conveying auditable information regarding provenance of a product that is cryptographically accurate while retaining anonymity of product and participant on a blockchain includes: receiving, by an input device interfaced with a computing device, a product identifier; generating, by a processor of the computing device, a digital token by applying a hashing algorithm to the product identifier; generating, by the processor of the computing device, an entry value by applying the hashing algorithm to a combination of an event identifier and the digital token; generating, by the processor of the computing device, a digital signature by digitally signing a data package using a private key of a cryptographic key pair, where the data package includes at least a blockchain address, the event identifier, and the digital token; and transmitting, by a transmitter of the computing device, the blockchain address, the digital signature, and the entry value to a node in a blockchain network.

A system for conveying auditable information regarding provenance of a product that is cryptographically accurate while retaining anonymity of product and participant on a blockchain includes: a blockchain network including a plurality of nodes; an input device interfaced with a computing device receiving a product identifier; and the computing device including a processor and a transmitter, wherein the processor generates a digital token by applying a hashing algorithm to the product identifier, generates an entry value by applying the hashing algorithm to a combination of an event identifier and the digital token, and generates a digital signature by digitally signing a data package using a private key of a cryptographic key pair, where the data package includes at least a blockchain address, the event identifier, and the digital token, and the transmitter transmits the blockchain address, the digital signature, and the entry value to one of the plurality of nodes in the blockchain network.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A ledger of all transactions of a blockchain-based assets, whether public or private, permissioned or non-permissioned. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Product Provenance Via Blockchain

Figure 1:
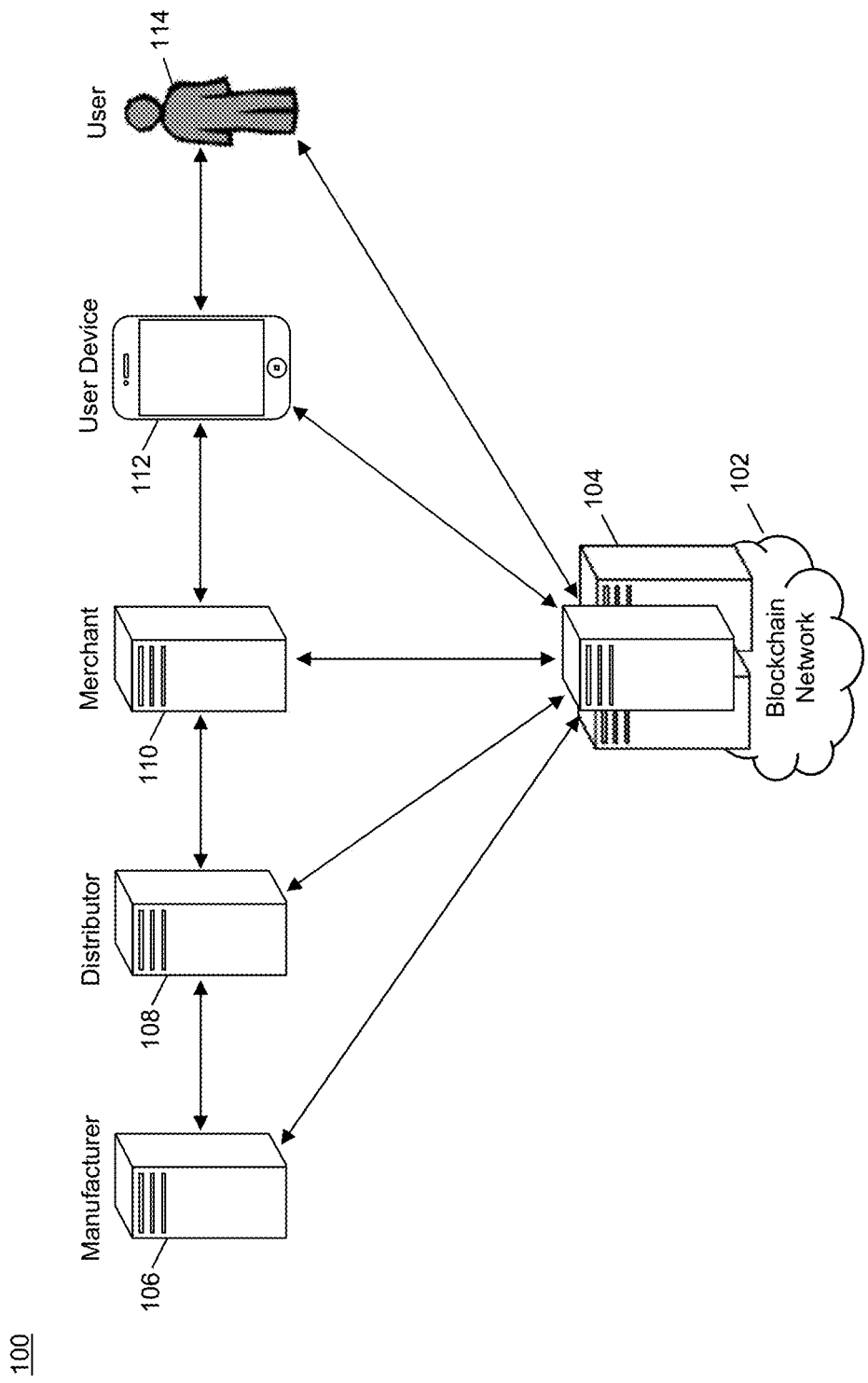
FIG. 1 is a block diagram illustrating a high-level system architecture for conveying product provenance through a blockchain in accordance with exemplary embodiments.

FIG. 1 illustrates a system 100 for conveying the provenance of a product with information that is auditable and cryptographically accurate and provable while retaining anonymity of the products and entities involved on a blockchain, which is able to be independent of any authentication or authorization mechanism, and thus has potential utility for any blockchain platform, whether public or private, permissioned or non-permissioned.

Figure 2:
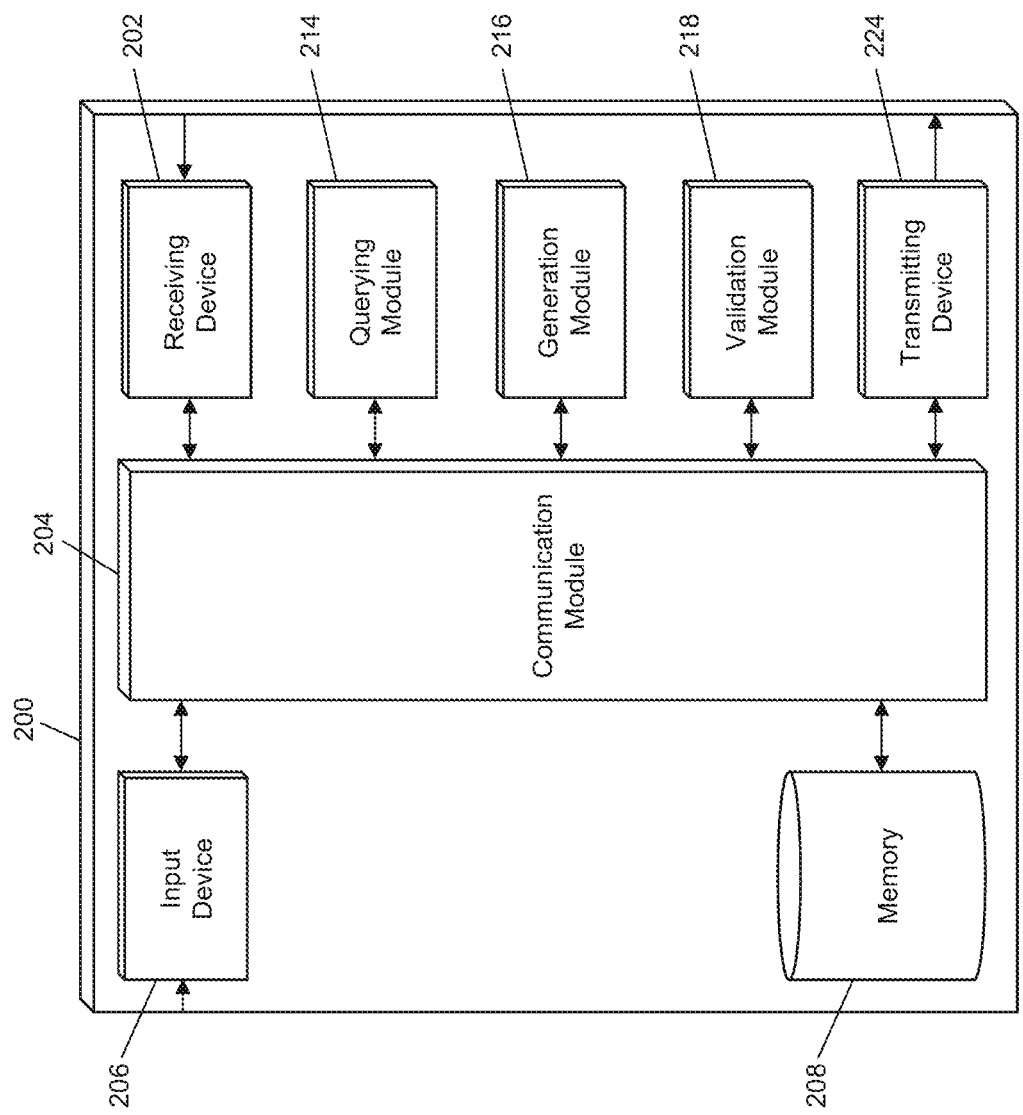
FIG. 2 is a block diagram illustrating computing systems for use in the system of FIG. 1 in accordance with exemplary embodiments.
Figure 5:
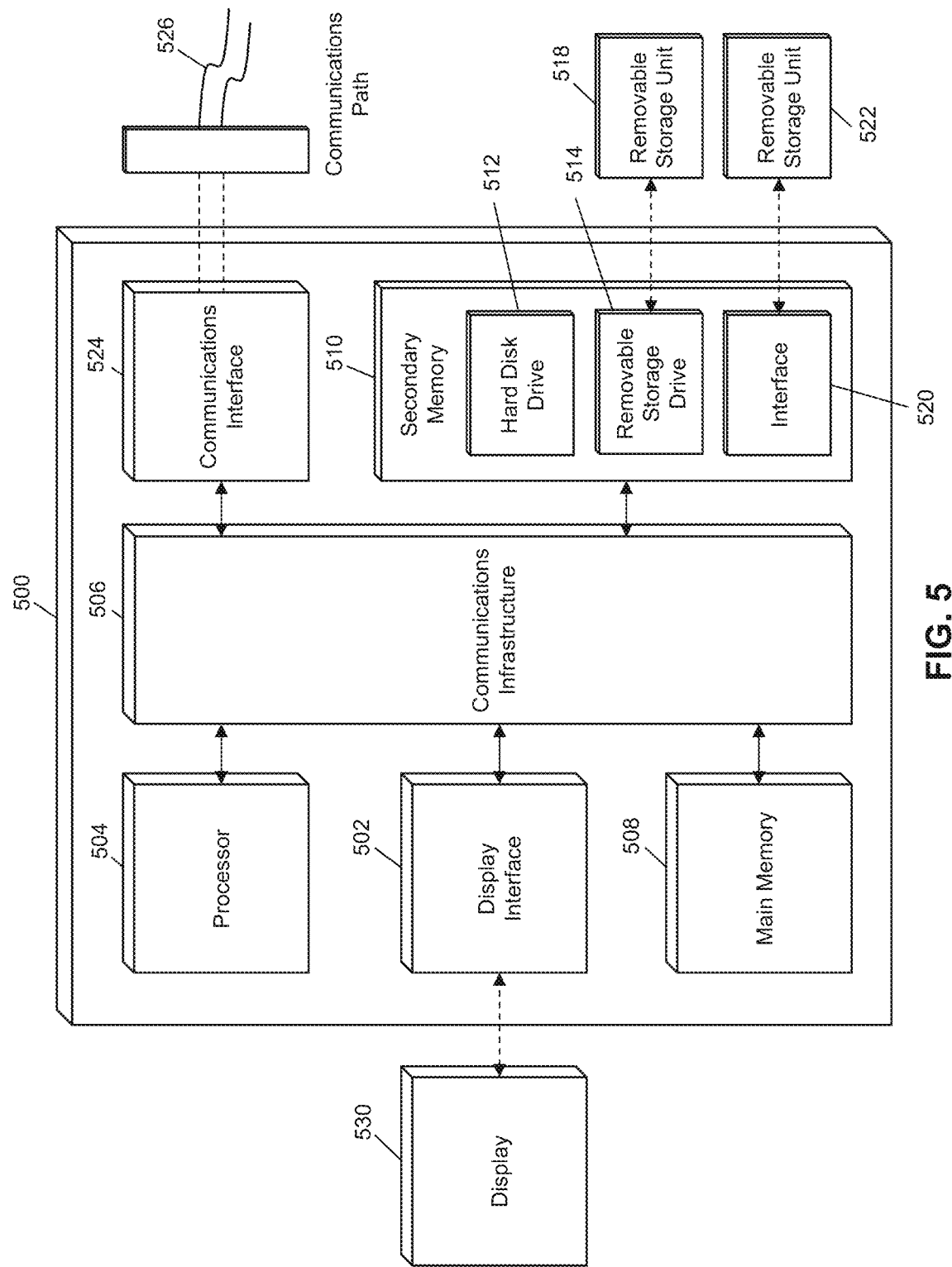
FIG. 5 is a block diagram illustrating a computer system architecture in accordance with exemplary embodiments.

The system 100 may include a blockchain network 102. The blockchain network 102 may be comprised of a plurality of blockchain nodes 104 (only a few of potentially many are shown for clarity of illustration). Each blockchain node 104 may be computing system, such as illustrated in FIG. 2 and FIG. 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network prior to the generation and addition of a new block to the blockchain in order for the change to be made permanent. Computational and communication limitations may make such a modification exceedingly difficult, if not impossible, thus rendering the blockchain immutable.

Blockchain data values, as discussed herein, may be configured to store data regarding the provenance of a product. In the system 100, a manufacturer 106 may manufacture products for sale, and may be interested in using a blockchain associated with the blockchain network 102 to keep a record of the provenance of their manufactured products. As discussed herein, products may refer to any objects, items, articles, substances, etc., for which an entity involved in the supply chain of which may be interested in tracking the provenance thereof. For instance, products may be shoes, jewelry, vehicles, prescription medication, laboratory samples, sports memorabilia, Olympic medals, sporting contest equipment, food products, etc., or virtually anything else.

In the system 100, the manufacturer 106 may manufacture products that are then distributed and eventually sold. The system 100 illustrates an example supply chain for manufactured products that involves the manufacturer 106, a single distributor 108, a merchant 110, and a user 114. However, the methods and systems discussed herein are applicable for any supply chain involving any number of entities performing any functions related to the provenance of a product that may be captured on a blockchain as discussed herein. For example, a supply chain may involve multiple distributors 108, such as a nationwide distributor, an international shipper, and a local carrier, and multiple merchants 110, such as wholesalers), retailer(s), and reseller(s), where the methods and systems discussed herein would be accordingly applicable to the entities involved.

In the example system 100, the manufacturer 106 may manufacture a plurality of products, which may be packaged together and provided to a distributor 108 for distribution. The distributor 108 may transport the package of products to a merchant 110, who may then separate the package into the individual products and make them available for sale to consumers. The consumers, as users 114, may then purchase the products from the merchant 110. As discussed in more detail below, users 114 may possess user devices 112 that may be used to identify the provenance of a product before or after purchase, as well as participate as a recipient and/or sender of the product in the supply chain, as applicable.

Each interaction with a product during the lifecycle of the product in the supply chain may be captured in the blockchain. As discussed herein, these interactions may be referred to as "events." Events may include, for instance, issuance (e.g., manufacture) of the product, sending (in any form such as shipping, delivering, transporting or pick-up/transferring access rights) of the product, receipt of the product, aggregation of multiple products together, disaggregation of the multiple products, and sale or consumption of the product. Each time an event occurs, the relevant entity may perform a number of actions resulting in submission of information to a blockchain node 104 in the blockchain network 102. The blockchain node 104 may include the information in a new blockchain data value that is included in a new block that is generated and added to the blockchain after confirmation by other blockchain nodes 104 using traditional methods and systems. In some cases, the actions performed by an entity related to the submission to the blockchain may vary based on the event and the involvement of other entities. For instance, as discussed herein, a sending or receiving event may be more involved than an issuance or aggregation event, as discussed below.

As part of an event, an entity may first identify the product identifier for the product. The product identifier may be a unique identifier that is uniquely associated with the product and may be unique among all of the instances of that product (e.g., the identifier may be unique across each shoe of a specific product line but may not be unique across all shoes). In some cases, the product identifier may be universally unique across all products, such as having an identification number of significant length or complexity, or as a combination of values. For instance, each shoe in a product line may have a serial number, where the product identifier may be a combination of the serial number with the product line (e.g., 12345678-CloudShoe6). The product identifier may be identified by the entity using any suitable means. For instance, a product identifier may be imprinted on a product, either directly or encoded in a machine-readable code (e.g., bar code, quick response code, etc.), affixed to the product (e.g., a removable tag), embedded in the product and read via a suitable device, etc. The entity may input the product identifier into a computing device using any suitable means, such as via manual entry by a user, transmission via an input device interfaced with the computing device, etc.

The entity's computing system may then generate a digital token for the product by applying a hashing algorithm to the product identifier. The hashing algorithm may be any suitable type of algorithm, such as the SHA-256 algorithm. In an exemplary embodiment, the hashing algorithm may be a one-way algorithm such that the resulting digital token cannot be reversed to identify the underlying product identifier. In some cases, the resulting digital token value may be of significant length and complexity to be collision resistant. Once the digital token is obtained, the entity may, using their computing system, generate a data package. The data package may include at least a blockchain address, the digital token, and an event identifier. The blockchain address may be generated using any suitable method and may be, for instance, generated via a public key associated with the entity (e.g., in a cryptographic key pair associated therewith) or using a predetermined algorithm. The event identifier may be a value that indicates the event to which the resulting blockchain entry corresponds. For instance, the event identifier may be "issue," "send," "receive," "aggregate," "disaggregate", or "consume."

Once a data package is generated, the entity may digitally sign the data package using a private key of a cryptographic key pair associated with the entity. The digital signature may be generated using any suitable algorithm that uses the private key, where the resulting signature is verifiable using the corresponding public key of the cryptographic key pair. The entity may also generate an entry value for the event, where the entry value is generated by hashing a combination of the event identifier and digital token for the product. The entry value, digital signature, and address may each then be transmitted to a blockchain node 104 in the blockchain network 102 as a submission for the event for the product. The data may then be included in a new blockchain data value, which is included in a new block that is confirmed by a plurality of the blockchain nodes 104 and then distributed to all of the blockchain nodes 104 in the blockchain network 1024 and added to the blockchain.

Each event for a product that is added to the blockchain may be verifiable by other entities involved in the system 100. For instance, the manufacturer 106 may use the blockchain to submit an issue event for manufacture of the product to the blockchain. The user 114 may be interested in determining if a product they find for sale at a merchant 110 is a genuine product of the manufacture and not a fake. The user 114 may, using their user device 112, read the product identifier from the product. The user device 112 may be any computing device that is specifically programmed to be suitable for performing the functions discussed herein, such as the computing systems of FIGS. 2 and 5. The user 114 may then, via the user device 112, generate the digital token for the product by hashing the product identifier, and then generate an entry value using a combination of the "issue" event identifier and the digital token. The user device 112 can check the blockchain available from the blockchain network 1024 to identify a blockchain data value that includes their generated entry value. If no such entry value exists, then the product may not be genuine as the manufacturer 106 has or did not submit an issue event for a product having the read product identifier, which may indicate that the product is a fake. The user 114 may then refrain from purchasing the product.

If a blockchain data value is found that includes the entry value, the user 114 may attempt to validate the digital signature that was included in the blockchain data value using the manufacturer's public key from their cryptographic key pair. For instance, the manufacturer 106 may make their public key available (e.g., on their website, via an application program, etc.) to assist users 114 in verifying their products. The user 114 may use the public key to attempt to validate the digital signature. If the validation is successful, then the issue event for the product may be found to be submitted by the manufacturer and therefore the user 114 may find the product to be genuine. If the validation is unsuccessful, then the issue event may have been submitted by a different entity other than the manufacturer 106 and may therefore be considered untrustworthy for the user 114. The user 114 may then refrain from purchasing the product.

In instances where multiple entities may be involved in an event, a confirmation value may be used in place of the digital token in the data package and entry value. Such an instance may include, for example, the sending of a product from a manufacturer 106 to a distributor 108 for distribution, or a distributor 108 to a merchant 110 for sale, or receipt thereof. In these instances, the confirmation value may be generated using a combination of the digital token, a public key associated with the other involved entity (e.g., the recipient for a "send" event), and a confirmation key. The confirmation key may be generated using a suitable key derivation algorithm, such as the hash-based message authentication code (HMAC) key derivation function (KDF) known as "HDKF." The confirmation key may be derived from a combination of the digital token and a shared secret that is shared between both entities. In an exemplary embodiment, the shared secret may be generated using a private key of the submitting entity (e.g., the sender in a "send" event) and the public key of the involved entity (e.g., the recipient in the "send" event") using a suitable algorithm, such as the Elliptic-curve Diffie-Hellman (ECDH) key agreement protocol. The resulting confirmation value may then be used in place of the digital token in the data package for which the digital signature is generated, and in place of the digital token in the entry value that is included in the blockchain data value.

The digital signature in blockchain data values where a confirmation value is used in place of the digital token may still be validated by any interested entity using the public key of the entity that submitted the event entry. However, the confirmation value used in the entry may only be validated by the involved entities or any party expressly authorized thereby, due to use of the shared secret. For instance, in the above example, the distributor 108 as sender may use their private key and the public key of the merchant 110 as recipient to generate the shared secret used to generate the confirmation key that is part of the confirmation value. Only the distributor 108, merchant 110, or an authorized third party, such as an auditor, may be able to generate the shared secret that is combined with the digital token to be able to generate its own version of the entry value for validation thereof in the blockchain data value.

Aggregation events for a product may involve a plurality of products being aggregated together into a single unit for use in distribution, such as to simplify the logistic process of transferring possession of products. For instance, it may be time consuming and difficult (e.g., due to packaging and volume) for a distributor 108 to manually scan thousands of products. Instead, the products may be aggregated into a single pallet that is secured and given a single value to be used in the manner of a product identifier for sending and receiving. However, the aggregation of products into the package may need to be tracked, such as to ensure full capturing of the provenance of each product, and for auditability should a product in the package go missing during the process. For aggregation, the entity may generate a list of each of the digital tokens for all of the products in the package, where a single value generated from the list may be used as the product identifier for the package. For example, in an exemplary embodiment, a Merkle tree may be generated using the digital tokens, where the root of the Merkle tree may be used as the product identifier for the aggregated package. A blockchain data value may be added to the blockchain for the "aggregate" event, where the entry value and data package utilize the Merkle root as the product identifier thereof. For disaggregation, the same product identifier may be used with a "disaggregate" event, with any subsequent transfers of each product identified using its individual digital token.

For aggregation or disaggregation events, entities may be able to audit to ensure transfer of all products by use of the Merkle root. For instance, the manufacturer 106 may issue a dozen products on the blockchain and aggregate the dozen products into a single package. The package may be given to a distributor 108 where the manufacturer 106 submits a "send" event with the package's token and the distributor 108 may submit a "receive" event with the same token for the package. The distributor 108 may then transport the package to a merchant 110 for delivery. The distributor 108 may submit its own "send" event to the merchant 110. The merchant 110 may scan each of the products in the received package to generate the Merkle root thereof for submission of its own "receive" event for the package. The merchant 110 may find out that the Merkle root it generates is different from the identifier used in the "send" event that the distributor 108 submitted. The merchant 110 may thereby realize that one of the products in the package went missing. Due to the submitted events during the logistical process, the entities may be able to identify that the package went missing at some point during the delivery, due to the use of the correct Merkle root during the issuing, aggregation, and prior send and receive events. The entities may be able to therefore identify precisely which product is missing and when as a result of the provenance being captured for each product and the package.

In some embodiments, additional events regarding the manufacture of a product may be utilized to provide additional information regarding the creation and manufacture of a product. For instance, for a shoe, the provenance of each ingredient utilized in the shoe may be tracked in the blockchain as well, such as to enable a user 114 to ensure that the leather procured for the shoe was provided by an ethical producer of leather, where transfer of the leather from the provider to the manufacturer 106 and use thereof is able to be verified in the blockchain using the methods discussed herein. Similarly, the life cycle of a consumable food product may also be tracked, such as to assist in cases where a food product may become contaminated or other issue discovered. For example, if beef is found to be tainted, it may be traced to the original farm through the blockchain, where other tainted beef may be discovered and the merchants 110 that received the tainted beef quickly and easily identified to ensure the tainted product is pulled from shelves and users 114 that purchased the tainted beef more quickly and easily notified. The result is faster, more accurate, and more efficient tracking of product provenance of all types.

In some embodiments, a cuckoo filter or Bloom filter may be used for verification and improvement of traceability of products stored in the blockchain. Cuckoo filters and Bloom filters utilize hashing of unique values for items to determine if the item exists in an element set or does not exist in the element set. As will be apparent to persons having skill in the relevant art, cuckoo filters may be used in instances where an entity seeks to determine that a product is not included in a set (e.g., a product being offered for sale by the retailer is not included in an aggregated set of products) while a Bloom filter may be used in cases where entities may be interested in determining that an element set includes a specific product (e.g., an item is loose from a palette and the distributor wants to confirm the item is still in an aggregated set of products).

In such embodiments, an entity may generate a cuckoo or Bloom filter for a plurality of products. The filter may utilize the hashed product identifiers as discussed above, such as by applying a predetermined hashing algorithm to product identifiers, such as may be displayed on a product or included in a list accompanying the products. In some cases, other identifiers may be used, such as to obscure information about the product or to differentiate from the hashed identifiers stored in the blockchain. For example, a different hashing algorithm may be applied to the product identifiers for use in the cuckoo or Bloom filter, or a hashing algorithm may be applied to product data different from the product identifier. In an example, the blockchain may store a hash of a product's registration number, while the filter may utilize a hash of the product's serial number.

When an entity, such as the distributor 108 or merchant 110, wants to determine if a specific product is included in a set of products, the entity may pass the hashed product identifier for that specific product through the proper filter. The result may identify that the product is included in the set of products or not included in the set of products. The entity may then proceed accordingly. For instance, if the product is not included in the set of products and it should be for the sake of distribution, the entity may perform a new "aggregate" event to add the product into the set of products (e.g., which may be performed after a "disaggregate" event for the products that are currently in the set).

In some embodiments, filters may be stored in the blockchain. In some cases, a cuckoo or Bloom filter may only be stored in blockchain data values for events where a filter may be desired, such as for "aggregate" or "disaggregate" events. In other embodiments, filters may not be stored in the blockchain, such as to reduce the file size of the blockchain. In such embodiments, blockchain nodes 104 may store filters in internal storage or external storage accessible thereby. In some cases, filters may be generated by the entities in the system 100 and provided to other entities as necessary. For example, the distributor 108 may generate a filter prior to delivery of a set of products on which the filter is generated and provide the filter to the merchant 110 when the products are delivered to the merchant 110. In such an instance, the merchant 110 may be able to use the filter to quickly determine that each product in the set was successfully delivered. In some embodiments, a reference to a filter may be stored in the blockchain. For example, the entity may generate a token, which may be a hash value of the filter itself or a hash value of a combination of the filter and another value, such as the hashed product identifier for a specific product. That token may be stored in the blockchain data value accompanying the event. In some cases, the entity that generated the filter may digitally sign the token prior to submission to the blockchain, such as using their private key. In such cases, the digital signature may be stored in the blockchain data value with the signature. In some instances, a separate blockchain may be used to store filters, or filters may be stored in blockchain data values separate from those used to track the provenance of products.

Cuckoo and Bloom filters, as discussed herein, may utilize any suitable types of hashing algorithms and may use any suitable number of rounds of hashing, which may vary based on the size of the set of products, the type of product (e.g., more expensive or rare products may utilize additional hashing rounds), a desired type of security, etc. In some cases, the same hashing algorithm may be used for each of the hashing rounds. In other cases, the hashing algorithm may vary based on the round. The filter may also utilize a bitmap size that is suitable for the set of products and the desired use of the filter. For example, the bitmap size may be twice the size of the number of products included in the set, such as to reduce the likelihood of collisions. In some cases, the number of rounds, hashing algorithms used, bitmap size, and number of products in the set of products may be included in the blockchain data value, transmitted with the filter, or stored with the filter, which may be provided to an entity that wants to utilize the filter to determine if a product is included in the filter or not included in the filter.

In some cases, a filter may be used to enable an entity to identify additional information about a product. In an example, the manufacturer 106 may produce pharmaceutical medication, and may produce bottles that include the same number of caplets, but with three different strengths. The bottles may each be aggregated into a single set of products, but the manufacturer 106 may generate a separate Bloom filter for each of the different strengths, where each product added to the Bloom filter is of the respective strength (e.g., a first filter for 100 mg caplets, a second filter for 250 mg caplets, and a third filter for 500 mg caplets). The manufacturer 106 may digitally sign the Bloom filters and make the filters available. When the merchant 110 receives the products from the distributor 108 and disaggregates the products, they may have all of the bottles and need to separate the bottles prior to sale or use. Without filters, they would have to examine each bottle individually, which may be time consuming and could result in error. With filters, the merchant 110 may receive the three Bloom filters from the manufacturer 106 (e.g., which can be verified using the manufacturer's public key on the digital signature) and pass the hashed product identifier for each bottle through the Bloom filters. If the result for a Bloom filter is that the product is included in the respective set, then the merchant 110 can be assured that the bottle has caplets of the strength associated with that filter as a result of the manufacturer's own filter. As a result, the merchant 110 can sort the medication efficiently and with less opportunity for error.

The use of cuckoo filters and Bloom filters may enable entities to determine if products are included in a set of products or not included in the set of products, as desired and based on the filter used, without the entity having to go through the entire set of products. This can result in a time and resource savings for the entity, as well as provide greater privacy for the products, as hashed values may be used which may enable the entity to utilize the filter without having to identify the underlying product or actual product identifiers in some instances.

The methods and systems discussed herein therefore enable every entity involved in the system 100, and any other interested party, to be able to view and verify the provenance of a product. Due to the use of digital tokens, digital signatures, and hashing, no information regarding the products themselves or the entities involved is made publicly available, including the tokens for any product, let alone product identifiers. As a result, the anonymity for every entity is protected and the ability for a nefarious actor to submit false information is minimized. The result is a system where information regarding product provenance in a supply chain is cryptographically accurate and publicly available, without compromising the anonymity of the products and entities involved.

Computing System

FIG. 2 illustrates an embodiment of a computing system 200. It will be apparent to persons having skill in the relevant art that the embodiment of the computing system 200 illustrated in FIG. 2 is provided as illustration only and may not be exhaustive to all possible configurations of the computing system 200 suitable for performing the functions as discussed herein. For example, the computer system 500 illustrated in FIG. 5 and discussed in more detail below may be a suitable configuration of the computing system 200. In some cases, each blockchain node 104, manufacturer 106, distributor 108, merchant 110, or user device 112 in the system 100 may be configured similar to the computing system 200 in FIG. 2 or computer system 500 in FIG. 5, such as including the components illustrated therein.

The computing system 200 may include a receiving device 202. The receiving device 202 may be configured to receive data over one or more networks via one or more network protocols. In some instances, the receiving device 202 may be configured to receive data from blockchain nodes 104, manufacturers 106, distributors 108, merchants 110, user devices 112, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by manufacturers 106, distributors 108, merchants 110, user devices 112, and other computing systems that may be superimposed or otherwise encoded with data to be included in a blockchain data value, such as an address, entry value, and digital signature. In some cases, data signals received from such computing systems may be superimposed or otherwise encoded with requests for blockchain data values, such as may include requests for blockchain data generally or specific entry values for which a blockchain data value is requested. The receiving device 202 may also be configured to receive data signals electronically transmitted by blockchain nodes 104, such as may be superimposed or otherwise encoded with blockchain data values, new blocks for confirmation, confirmations for blocks, confirmed blocks, and other data as discussed herein.

The computing system 200 may also include a communication module 204. The communication module 204 may be configured to transmit data between modules, engines, databases, memories, and other components of the computing system 200 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing system 200 and external components of the computing system 200, such as externally connected databases, display devices, input devices 206, etc. The computing system 200 may also include a processing device. The processing device may be specifically configured to perform the functions of the computing system 200 discussed herein as will be apparent to persons having skill in the relevant art based on this description. In some embodiments, the processing device may include and/or be comprised of a plurality of engines and/or modules specially configured to perform one or more functions of the processing device, such as a querying module 214, generation module 216, validation module 218, etc. As used herein, the term "module" may be software compiled on hardware or hardware otherwise particularly programmed to receive an input, perform one or more processes using the input, and provides an output. The input, output, and processes performed by various modules will be apparent to one skilled in the art based upon the present disclosure.

The computing system 200 may also include or be otherwise interfaced with one or more input devices 206. The input devices 206 may be internal to the computing system 200 or external to the computing system 200 and connected thereto via one or more connections (e.g., wired or wireless) for the transmission of data to and/or from. The input devices 206 may be configured to receive input from a user of the computing system 200, which may be provided to another module or engine of the computing system 200 (e.g., via the communication module 204) for processing accordingly. Input devices 206 may include any type of input device suitable for receiving input for the performing of the functions discussed herein, such as a keyboard, mouse, click wheel, scroll wheel, microphone, touch screen, track pad, camera, optical imager, etc. The input device 206 may be configured to, for example, receive product identifiers associated with products, such as may be read by an optical imager, manually input by a user, received via near field communication, etc.

The computing system 200 may also include a memory 208. The memory 208 may be configured to store data for use by the computing system 200 in performing the functions discussed herein, such as public and private keys, symmetric keys, etc. The memory 208 may be configured to store data using suitable data formatting methods and schema and may be any suitable type of memory, such as read-only memory, random access memory, etc. The memory 208 may include, for example, encryption keys and algorithms, communication protocols and standards, data formatting standards and protocols, program code for modules and application programs of the processing device, and other data that may be suitable for use by the computing system 200 in the performance of the functions disclosed herein. In some embodiments, the memory 208 may be comprised of or may otherwise include a relational database that utilizes structured query language for the storage, identification, modifying, updating, accessing, etc. of structured data sets stored therein. The memory 208 may be configured to store, for example, cryptographic keys, salts, nonces, communication information for the back-end system, etc.

The memory 208 may be configured to store algorithms for use in generating derivation keys, shared secrets, digital signatures, hash values, blocks, and the validation of such data. The memory 208 may also be configured to store keys of cryptographic key pairs including private keys and public keys, as applicable. The memory 208 may also be configured to store a blockchain or data associated therewith.

The computing system 200 may include a querying module 214. The querying module 214 may be configured to execute queries on databases to identify information. The querying module 214 may receive one or more data values or query strings and may execute a query string based thereon on an indicated database, such as the memory 208 of the computing system 200 to identify information stored therein. The querying module 214 may then output the identified information to an appropriate engine or module of the computing system 200 as necessary. The querying module 214 may, for example, execute a query on the memory 208 to identify a hashing algorithm used to generate a digital token, identify a private key for use in digitally signing a data package, identify a public key to validate a digital signature, etc.

The computing system 200 may also include a generation module 216. The generation module 216 may be configured to generate data for use by the computing system 200 in performing the functions discussed herein. The generation module 216 may receive instructions as input, may generate data based on the instructions, and may output the generated data to one or more modules of the computing system 200. For example, the generation module 216 may be configured to generate digital tokens, data packages, confirmation values, derivation keys, shared secrets, digital signatures, blockchain data values, block headers, blocks, Merkle trees, block reference values, data reference values, or any other data discussed herein through the use of data, appropriate keys, algorithms, etc. as also discussed herein.

The computing system 200 may also include a validation module 218. The validation module 218 may be configured to perform validations for computing systems 200 to validate data as discussed herein. The validation module 218 may receive an instruction as input, which may also be accompanied by data to be used in the validation or data for validating, may perform the validation as instructed, and may output a result of the validation to another module or engine of the computing system 200. The validation module 218 may be configured to, for instance, validate a digital signature, validate an entry value, validate a digital token or confirmation value, validate a Merkle root, or perform other checks or validations as discussed herein.

The computing system 200 may also include a transmitting device 224. The transmitting device 224 may be configured to transmit data over one or more networks via one or more network protocols. In some instances, the transmitting device 224 may be configured to transmit data to blockchain nodes 104, manufacturers 106, distributors 108, merchants 100, user devices 112, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to blockchain nodes 104 that may be superimposed or otherwise encoded with data to be included in a blockchain data value, such as an address, entry value, and digital signature. In some cases, data signals electronically transmitted to blockchain nodes 104 may be superimposed or otherwise encoded with requests for blockchain data values, such as may include requests for blockchain data generally or specific entry values for which a blockchain data value is requested. The transmitting device 224 may also be configured to electronically transmit data signals electronically to manufacturers 106, distributors 108, merchants 100, user devices 112, etc., such as may be superimposed or otherwise encoded with blockchain data values, new blocks for confirmation, confirmations for blocks, confirmed blocks, and other data as discussed herein.

Process for Capturing Product Provenance Via Blockchain

Figure 3:
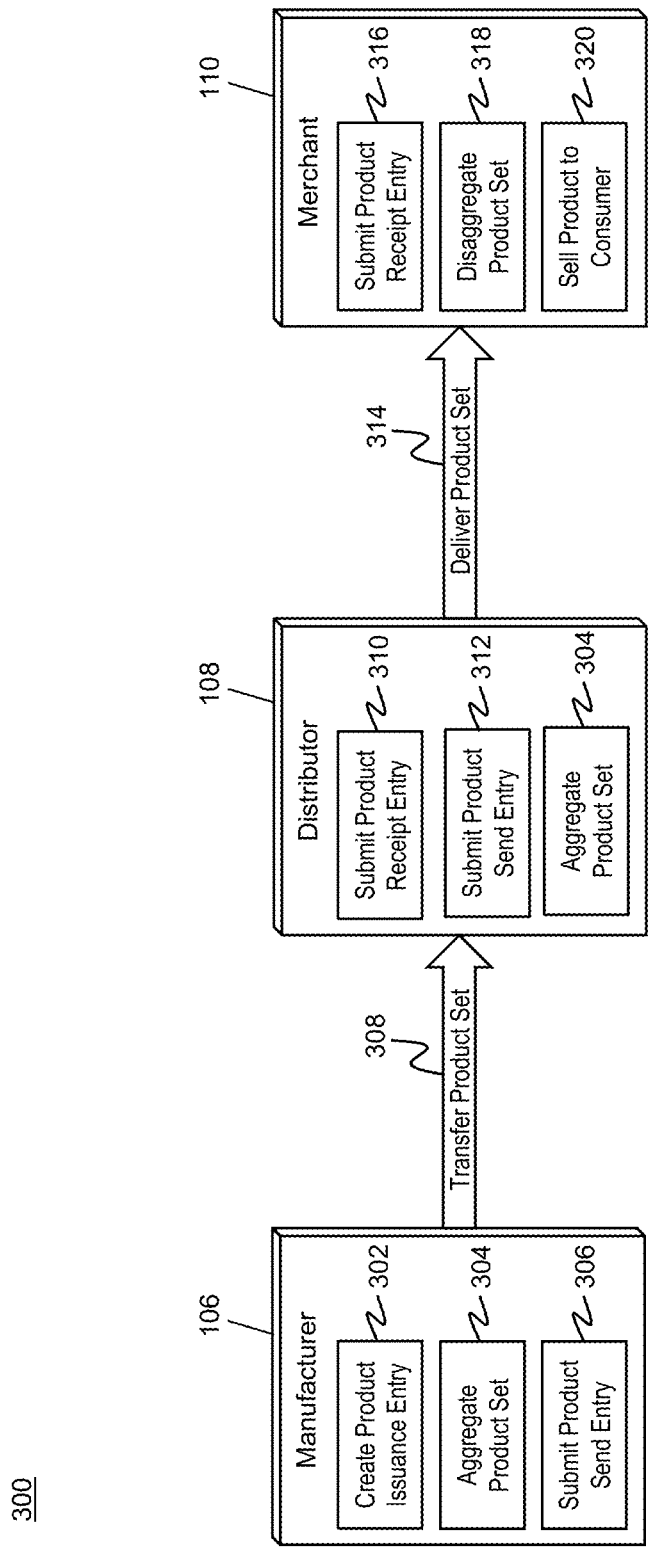
FIG. 3 is a flow diagram illustrating a process for conveyance of a product in a supply chain in the system of FIG. 1 where auditability is available via a blockchain in accordance with exemplary embodiments.

FIG. 3 illustrates an example process 300 executed in the system 100 for capturing the provenance of a product that is manufactured and distributed for sale through a blockchain using digital tokens and events as discussed above.

In step 302, the manufacturer 106 may manufacture a product that will be available for sale and, as part of the manufacture, may assign a product identifier to the product and submit an "issue" event for the product. Submission of the "issue" event may include the generation of a digital token, a new address, a data package, a digital signature, an entry value, and submission of the data for a blockchain data value to a blockchain node 104 in the blockchain network 102. Code utilized by the manufacturer 106 for the "issue" event may include, as follows:

create(VALUE);
    TOKEN=HASH(VALUE);
    EVENT="ISSUE";
    ADDRESS=new Address( );
    SIGNATURE=SIGN({"ISSUE"+ADDRESS+TOKEN}, ISSUER_PRIVATE);
    CHAIN_ENTRY={ADDRESS, HASH("ISSUE+TOKEN), SIGNATURE};

Where the hash of the "ISSUE" event and the digital token may be the entry value, and where ISSUER_PRIVATE may indicate use of the manufacturer's private key for the digital signature. The manufacturer 106 may repeat step 302 for the manufacture and issue of a plurality of products, each with their own unique product identifier and, subsequently, digital token. In step 304, the manufacturer 106 (or distributor 108 depending on product types) may aggregate manufactured products into a single package, such as by packaging the products together into a single, wrapped pallet for transportation. As part of the aggregation, the manufacturer 106 may submit an "aggregate" event to a blockchain node 104 in the blockchain network 1024, where a root of a Merkle tree of all the product identifiers for the products included in the package is used. Code utilized by the manufacturer 106 for the "aggregate" event may include, as follows:

PACKAGE_TOKEN=MERKLE_ROOT(list(TOKEN));
    SIGNATURE=SIGN({"AGGREGATE"+ADDRESS+PACKAGE_TOKEN}, AGGREGATOR_PRIVATE);
    CHAIN_ENTRY={ADDRESS, HASH("AGGREGATE"+PACKAGE_TOKEN), SIGNATURE};

Where the AGGREGATOR_PRIVATE may indicate use of the manufacturer's private key for generating the digital signature. Once the aggregation has been performed, in step 306, the merchant 1104 may submit a "send" entry for the package to indicate sending of the package to a distributor 108 for transportation and distribution to merchants 110. In some embodiments, a single "send" entry may be submitted for the package. In other embodiments, the manufacturer 106 may submit a separate "send" entry for each product, where the package may only be referred to in "aggregate"

and "disaggregate" events. Code utilized by the manufacturer 106 for the "send" event for may include, as follows:

SENDER_CONFIRMATION={TOKEN+RECEIVER_PUBLIC+HKDF(TOKEN+ECDH(RECEIVER_PUBLIC, SENDER_PRIVATE))};

SIGNATURE=SIGN({"SEND"+ADDRESS+SENDER_CONFIRMATION}, SENDER_PRIVATE);

CHAIN_ENTRY={ADDRESS, HASH("SEND"+SENDER_CONFIRMATION), SIGNATURE};

Where the RECEIVER_PUBLIC may be the public key of the distributor 108, the SENDER_PRIVATE may be the private key of the manufacturer 106, the TOKEN may be a digital token if a product is being sent or a package token if the "send" event is for the entire package, HKDF may indicate derivation of a confirmation key, and ECDH may be used for generation of a shared secret. In step 308, the distributor 108 may take possession of the package of products from the manufacturer 106 for transportation to a merchant 110 for eventual sale.

Once the distributor 108 has received the package, they may, in step 310, submit their own "receive" step regarding receipt of the package of products from the manufacturer 106. As with the "send" event, the "receive" event may be a single receipt for a package of a plurality of products, or receipt of a package may entail submission of a "receive" event for each of the products included therein. Code utilized by the distributor 108 for the "receive" event may include, as follows:

RECEIVER_CONFIRMATION={TOKEN+SENDER_PUBLIC+HKDF(TOKEN+ECDH(SENDER_PUBLIC, RECEIVER_PRIVATE))};

SIGNATURE=SIGN({"RECEIVE"+ADDRESS+RECEIVER_CONFIRMATION}, RECEIVER_PRIVATE);

CHAIN_ENTRY={ADDRESS, HASH("RECEIVE"+RECIVER_CONFIRMATION), SIGNATURE};

Where the SENDER_PUBLIC may be the public key of the manufacturer 106, the RECEIVER_PRIVATE may be the private key of the distributor 108, the TOKEN may be the digital token for a product or package token for a package, HKDF may be used for derivation of a confirmation key, and ECHD may indicate generation of a shared secret. The distributor 108 may then transport the package of products to the merchant 110 using its logistical system. In some cases, the distributor 108 may add new "send" and "receive" events during each step in its logistical system (e.g., handing off from one employee, vehicle, etc. to another), such as for more comprehensive information regarding where a product and/or package is located, such as for stronger auditability and detection if a product becomes lost. Once the distributor 108 has finished its transportation process and is ready to deliver the package to the merchant 110, the distributor 108 may, in step 312, submit a last "send" event for sending of the package to the merchant 110. The distributor 108 may use the same code for the "send" event indicated above for step 306, where the distributor 108 may be the sender and the merchant 110 the receiver.

In step 314, the merchant 110 may take possession of the package. To indicate the receipt of the package, the merchant 110 may, in step 316, submit its own "receive" event to the blockchain node 104 in the blockchain network 1024. The merchant 110 may utilize the code indicated above for the "receive" event in step 310, where the distributor 108 may be the sender and the merchant 110 the receiver. Once the package has been received and indication thereof logged in the blockchain, the merchant 110 (or distributor 108 depending on product types) may, in step 318, disaggregate the package into its constituent products. As part of the disaggregation, the merchant 110 may submit a "disaggregation" event to the blockchain, where code utilized by the merchant 110 may include, as follows:

PACKAGE_TOKEN=MERKLE_ROOT(list(TOKEN));

SIGNATURE=SIGN({"DISAGGREGATE+ADDRESS+PACKAGE_TOKEN}, VENDOR_PRIVATE);

CHAIN_ENTRY={ADDRESS, HASH("DISAGGREGATE"+PACKAGE_TOKEN), SIGNATURE};

Where the VENDOR_PRIVATE may indicate use of the merchant's private key. The merchant 110 may then have each individual product disaggregated and available for sale to consumers. In step 320, a user 114 may approach the merchant 110 and purchase one of the products. In some embodiments, the transfer to the user 114 may be represented via the submission of a "send" event by the merchant 110 with the user's user device 112 as the receiver of such an event. In some such embodiments, the user device 112 may submit its own "receive" event. In other embodiments, a "consume" event may be submitted by the merchant 110 to the blockchain to indicate that the product has been "consumed," or purchased by an end user for use thereof, where tracking may no longer be available. In such cases, code utilized by the merchant 110 for a "consume" event may include, as follows:

SIGNATURE=SIGN({"CONSUME"+ADDRESS+TOKEN), VENDOR_PRIVATE};

CHAIN_ENTRY={ADDRESS, HASH("CONSUME"+TOKEN), SIGNATURE};

Where the VENDOR_PRIVATE may refer to use of the merchant's private key in digitally signing the data package. The result of the process 300 is a full provenance of the product from manufacture to end purchase by the user 114, where each involved entity may be able to check the provenance during each step in the process. For example, auditors may be able to ensure that the product was never in the hands of an unauthorized party and therefore is genuine by the time it is made available for purchase at the merchant 110. Likewise, the user 114 may be able to check if the product they are purchasing is genuine from the manufacturer 106.

Exemplary Method for Conveying Auditable Provenance Information

Figure 4:
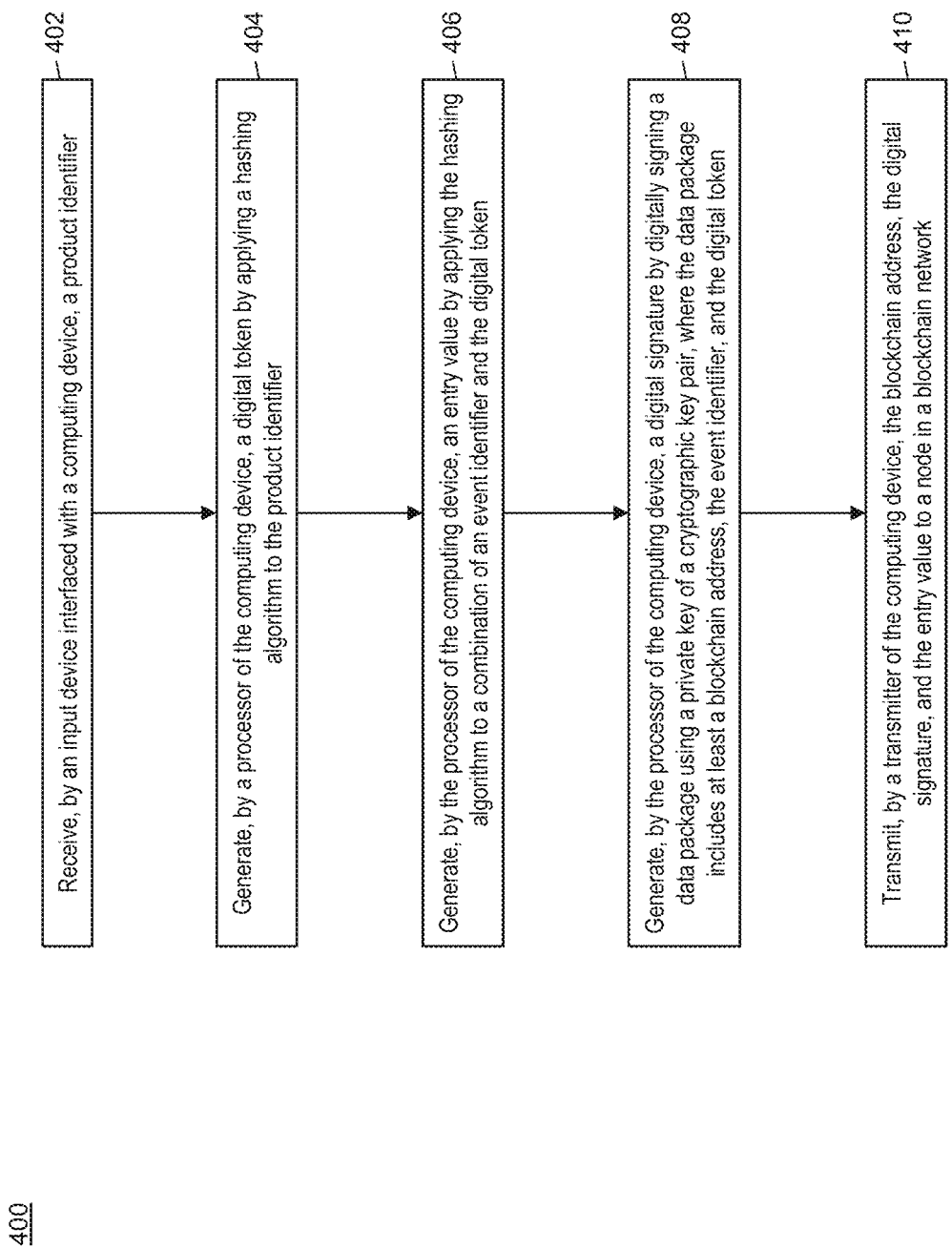
FIG. 4 is a flow chart illustrating an exemplary method for conveying auditable information regarding provenance of a product in accordance with exemplary embodiments.

FIG. 4 illustrates a method 400 for the conveying of auditable information regarding provenance of a product that is cryptographically accurate while retaining complete anonymity of product and participant on a blockchain in certain embodiments.

In step 402, a product identifier may be received by an input device (e.g., input device 206) interfaced with a computing device (e.g., computing system 200). In step 404, a digital token may be generated by a processor (e.g., generation module 216) of the computing device by applying a hashing algorithm to the product identifier. In step 406, an entry value may be generated by the processor of the computing device by applying the hashing algorithm, to a combination of an event identifier and the digital token.

In step 408, a digital signature may be generated by the processor of the computing device by digitally signing a data package using a private key of a cryptographic key pair, where the data package includes at least a blockchain address, the event identifier, and the digital token. In step 410, the blockchain address, the digital signature, and the entry value may be transmitted by a transmitter (e.g., transmitting device 224) of the computing device to a node (e.g., blockchain node 104) in a blockchain network (e.g., blockchain network 102).

In some embodiments, the method 400 may further include generating, by the processor of the computing device, a confirmation key by applying a key derivation algorithm to a combination of the digital token and a shared secret value, wherein a confirmation package includes the digital token, a secondary public key, and the confirmation key, and the confirmation package is included in the entry value and the data package instead of the digital token. In a further embodiment, the event identifier may indicate sending of a product associated with the product identifier and the secondary public key may be associated with a recipient entity of the product.

In one embodiment, the method 400 may also include: receiving, by the node in the blockchain network, the blockchain address, the digital signature, and the entry value from the computing device; generating, by the node in the blockchain network, a new block including a block header and one or more blockchain data values, the one or more blockchain data values including a new blockchain data value that includes the blockchain address, the digital signature, and the entry value; and transmitting, by the node in the blockchain network, the generated new block to a plurality of additional nodes in the blockchain network. In some embodiments, the method 400 may further include validating, by the node in the blockchain network, the digital signature using a public key of the cryptographic key pair.

In one embodiment, the method 400 may also include: receiving, by a second computing system, the digital signature; and validating, by the second computing system, the digital signature using a public key of the cryptographic key pair. In some embodiments, the method 400 may further include: receiving, by a second computing system, the entry value; receiving, by the second computing system, the product identifier; generating, by the second computing system, a comparison hash value by applying the hashing algorithm to the received product identifier; and validating, by the second computing system, the received entry value by comparing the received entry value to the generated comparison hash value.

In one embodiment, the method 400 may also include: receiving, by the input device interfaced with the computing device, a plurality of additional identifiers; generating, by the processor of the computing device, an additional token for each of the plurality of additional identifiers by applying the hashing algorithm to the respective additional identifier; and identifying, by the processor of the computing device, a package token by generating a Merkle tree using the product identifier and the plurality of additional identifiers, where the package token is a root value of the Merkle tree, and the package token is included in the data package and used in the entry value instead of the digital token. In some embodiments, the method 400 may further include: generating, by the processor of the computing device, a cuckoo filter or Bloom filter utilizing the generated digital token and a plurality of additional tokens; generating, by the processor of the computing device, a second digital signature by digitally signing the cuckoo filter or Bloom filter using the private key of the cryptographic key pair; and transmitting, by the transmitter of the computing device, the generated cuckoo filter or Bloom filter and second digital signature to a separate computing system.

Computer System Architecture

FIG. 5 illustrates a computer system 500 in which embodiments of the present disclosure, or portions thereof, may be implemented as computer-readable code. For example, the blockchain nodes 104, manufacturer 106, distributor 108, merchant 110, and user device 112 of FIG. 1 and the computing system 200 of FIG. 2 may be implemented in the computer system 500 using hardware, software compiled on hardware, firmware, non-transitory computer readable media having instructions stored thereon, or a combination thereof and may be implemented in one or more computer systems or other processing systems. Specifically configures hardware, software, firmware, memory or any suitable combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for conveying auditable information regarding provenance of a product that is cryptographically accurate while retaining complete anonymity of product and participant on a blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for conveying auditable information regarding provenance of a product that is cryptographically accurate while retaining complete anonymity of product and participant on a blockchain, comprising:

receiving, by an input device interfaced with a computing device, a product identifier;

generating, by a processor of the computing device, a digital token by applying a hashing algorithm to the product identifier;

generating, by the processor of the computing device, an entry value by applying the hashing algorithm to a combination of an event identifier and the digital token;

generating, by the processor of the computing device, a digital signature by digitally signing a data package using a private key of a cryptographic key pair, where the data package includes at least a blockchain address, the event identifier, and the digital token; and transmitting, by a transmitter of the computing device, the blockchain address, the digital signature, and the entry value to a node in a blockchain network.

2. The method of claim 1, further comprising:

generating, by the processor of the computing device, a confirmation key by applying a key derivation algorithm to a combination of the digital token and a shared secret value, wherein a confirmation package includes the digital token, a secondary public key, and the confirmation key, and the confirmation package is included in the entry value and the data package instead of the digital token.

3. The method of claim 2, wherein the event identifier indicates sending of a product associated with the product identifier and the secondary public key is associated with a recipient entity of the product.

4. The method of claim 1, further comprising:

receiving, by the node in the blockchain network, the blockchain address, the digital signature, and the entry value from the computing device;

generating, by the node in the blockchain network, a new block including a block header and one or more blockchain data values, the one or more blockchain data values including a new blockchain data value that includes the blockchain address, the digital signature, and the entry value; and transmitting, by the node in the blockchain network, the generated new block to a plurality of additional nodes in the blockchain network.

5. The method of claim 1, further comprising:

validating, by the node in the blockchain network, the digital signature using a public key of the cryptographic key pair.

6. The method of claim 1, further comprising:

receiving, by a second computing system, the digital signature;

validating, by the second computing system, the digital signature using a public key of the cryptographic key pair.

7. The method of claim 1, further comprising:

receiving, by a second computing system, the entry value;

receiving, by the second computing system, the product identifier;

generating, by the second computing system, a comparison hash value by applying the hashing algorithm to the received product identifier; and validating, by the second computing system, the received entry value by comparing the received entry value to the generated comparison hash value.

8. The method of claim 1, further comprising:

receiving, by the input device interfaced with the computing device, a plurality of additional identifiers;

generating, by the processor of the computing device, an additional token for each of the plurality of additional identifiers by applying the hashing algorithm to the respective additional identifier; and identifying, by the processor of the computing device, a package token by generating a Merkle tree using the product identifier and the plurality of additional identifiers, where the package token is a root value of the Merkle tree, and the package token is included in the data package and used in the entry value instead of the digital token.

9. The method of claim 1, further comprising:

generating, by the processor of the computing device, a cuckoo filter or Bloom filter utilizing the generated digital token and a plurality of additional tokens;

generating, by the processor of the computing device, a second digital signature by digitally signing the cuckoo filter or Bloom filter using the private key of the cryptographic key pair; and transmitting, by the transmitter of the computing device, the generated cuckoo filter or Bloom filter and second digital signature to a separate computing system.

10. A system for conveying auditable information regarding provenance of a product that is cryptographically accurate while retaining complete anonymity of product and participant on a blockchain, comprising:

a blockchain network including a plurality of nodes;

an input device interfaced with a computing device receiving a product identifier; and the computing device including a processor and a transmitter, wherein the processor generates a digital token by applying a hashing algorithm to the product identifier, generates an entry value by applying the hashing algorithm to a combination of an event identifier and the digital token, and generates a digital signature by digitally signing a data package using a private key of a cryptographic key pair, where the data package includes at least a blockchain address, the event identifier, and the digital token, and the transmitter transmits the blockchain address, the digital signature, and the entry value to one of the plurality of nodes in the blockchain network.

11. The system of claim 10, wherein the processor of the computing device further generates a confirmation key by applying a key derivation algorithm to a combination of the digital token and a shared secret value, a confirmation package includes the digital token, a secondary public key, and the confirmation key, and the confirmation package is included in the entry value and the data package instead of the digital token.

12. The system of claim 11, wherein the event identifier indicates sending of a product associated with the product identifier and the secondary public key is associated with a recipient entity of the product.

13. The system of claim 10, wherein the one of the plurality of nodes in the blockchain network:

receives, the blockchain address, the digital signature, and the entry value from the computing device;

generates a new block including a block header and one or more blockchain data values, the one or more blockchain data values including a new blockchain data value that includes the blockchain address, the digital signature, and the entry value; and transmits the generated new block to a plurality of additional blockchain nodes in the blockchain network.

14. The system of claim 10, wherein the one of the plurality of nodes in the blockchain network validates the digital signature using a public key of the cryptographic key pair.

15. The system of claim 10, further comprising:

a second computing system, wherein the second computing system receives the digital signature, and validates the digital signature using a public key of the cryptographic key pair.

16. The system of claim 10, further comprising:
a second computing system, wherein the second computing system
receives the entry value,
receives the product identifier,
generates a comparison hash value by applying the hashing algorithm to the received product identifier, and
validates the received entry value by comparing the received entry value to the generated comparison hash value.

17. The system of claim 10, wherein
the input device interfaced with the computing device further receives a plurality of additional identifiers,
the processor of the computing device further
generates an additional token for each of the plurality of additional identifiers by applying the hashing algorithm to the respective additional identifier, and
identifies a package token by generating a Merkle tree using the product identifier and the plurality of additional identifiers, where the package token is a root value of the Merkle tree, and
the package token is included in the data package and used in the entry value instead of the digital token.

18. The system of claim 10, wherein
the processor further
generates a cuckoo filter or Bloom filter utilizing the generated digital token and a plurality of additional tokens, and
generates a second digital signature by digitally signing the cuckoo filter or Bloom filter using the private key of the cryptographic key pair, and
the transmitter further transmits the generated cuckoo filter or Bloom filter and second digital signature to a separate computing system.

* * * * *